US008931255B2

(12) United States Patent
Wilson

(10) Patent No.: US 8,931,255 B2
(45) Date of Patent: Jan. 13, 2015

(54) TECHNIQUES FOR RAISING EXHAUST TEMPERATURES

(71) Applicant: Cummins Inc., Columbus, IN (US)

(72) Inventor: Michael A. Wilson, North Yorkshire (GB)

(73) Assignee: Cummins Inc., Columbus, IN (US)

(*) Notice: Subject to any disclaimer, the term of this patent is extended or adjusted under 35 U.S.C. 154(b) by 126 days.

(21) Appl. No.: 13/644,214

(22) Filed: Oct. 3, 2012

(65) Prior Publication Data

US 2014/0090360 A1 Apr. 3, 2014

(51) Int. Cl.
| | |
|---|---|
| *F01N 3/00* | (2006.01) |
| *F01N 3/10* | (2006.01) |
| *F02D 7/00* | (2006.01) |
| *F02D 41/00* | (2006.01) |
| *F02D 41/02* | (2006.01) |
| *F02D 41/40* | (2006.01) |
| *F01N 3/20* | (2006.01) |

(52) U.S. Cl.
CPC .............. *F01N 3/10* (2013.01); *F02D 41/0087* (2013.01); *F02D 41/025* (2013.01); *F02D 41/405* (2013.01); *F01N 3/208* (2013.01); *F02D 41/0082* (2013.01); *Y02T 10/44* (2013.01); *Y02T 10/26* (2013.01)
USPC .................. 60/285; 60/274; 60/295; 60/301; 123/481

(58) Field of Classification Search
USPC ........... 60/274, 285, 286, 295, 301, 303, 311; 123/481
See application file for complete search history.

(56) References Cited

U.S. PATENT DOCUMENTS

| | | | |
|---|---|---|---|
| 4,086,762 A * | 5/1978 | Sakurai et al. ................... 60/282 |
| 4,274,373 A * | 6/1981 | Sugasawa et al. ............... 60/276 |
| 5,117,790 A | 6/1992 | Clarke et al. |
| 5,930,992 A | 8/1999 | Esch et al. |
| 6,594,990 B2 | 7/2003 | Kuenstler et al. |
| 6,868,667 B2 | 3/2005 | Surnilla |
| 6,904,752 B2 | 6/2005 | Foster et al. |
| 7,257,941 B1 | 8/2007 | Reuter |
| 7,461,504 B2 | 12/2008 | Warner et al. |
| 7,533,518 B2 | 5/2009 | Kurtz et al. |
| 7,854,114 B2 | 12/2010 | England |
| 2009/0254261 A1 | 10/2009 | Inoue et al. |
| 2010/0023241 A1* | 1/2010 | Guo et al. ....................... 701/103 |
| 2010/0107606 A1 | 5/2010 | Narayanaswamy et al. |
| 2011/0023824 A1 | 2/2011 | Asai |
| 2011/0163177 A1* | 7/2011 | Kiss .................................. 239/5 |

OTHER PUBLICATIONS

International Search Report and Written Opinion, ISAUS, PCT/US2013/063311, Cummins Inc., Feb. 27, 2014, 10 pgs.

* cited by examiner

*Primary Examiner* — Audrey K Bradley
(74) *Attorney, Agent, or Firm* — Krieg DeVault LLP

(57) ABSTRACT

One embodiment is a unique strategy for raising exhaust temperatures which includes deactivating a first group of cylinders while maintaining a second group of cylinders in a combustion mode and injecting fuel into each of one of the second group of cylinders not earlier than 2 degrees before top dead center (TDC). The strategy also includes passing fuel rich exhaust from the second group of cylinders into an exhaust pathway and oxidizing at least a portion of the fuel rich exhaust in the exhaust pathway. In one form, the oxidizing occurs independent of any catalytic influence. Other embodiments include unique methods, systems, and apparatus for raising exhaust temperatures and/or regenerating one or more components of an aftertreatment system. Further embodiments, forms, objects, features, advantages, aspects, and benefits shall become apparent from the following description and drawings.

20 Claims, 6 Drawing Sheets

TECHNIQUES FOR RAISING EXHAUST TEMPERATURES

BACKGROUND

The present application relates generally to operation of internal combustion engines, and more particularly but not exclusively to raising temperatures of an exhaust gas stream produced by an internal combustion engine for, by way of non-limiting example, facilitating regeneration of one or more components of an aftertreatment system.

Modern internal combustion engines must meet stringent emissions standards, including a maximum amount of nitrogen oxides ($NO_x$) that may be emitted. Many engines now utilize aftertreatment systems to reduce engine-out emissions to regulatory levels before release to the atmosphere. Aftertreatment systems often include multiple components, including particulate filters, oxidation catalysts, $NO_x$ adsorbers, $NO_x$ reduction catalysts, three-way catalysts, four-way catalysts, and can further include multiple components of the same type at various locations along the aftertreatment system flowpath. One well known way of removing oxides of nitrogen ($NO_x$) from engine exhaust is Selective Catalyst Reduction (SCR). In this system a catalyst is used to facilitate a reaction between $NO_x$ molecules and a reductant to convert the $NO_x$ into common atmospheric gasses.

Over time, one or more components of the aftertreatment system can become masked by deposits of certain constituents of the exhaust gas, which can decrease the efficiency of such components and result in an undesired increase in emissions. More particularly, and by way of non-limiting example, SCR systems can become masked with sulfur deposits which affect their efficiency in removing oxides of nitrogen ($NO_x$) from engine exhaust, particularly in situations where engines are operated with high sulfur fuels (e.g., having a sulfur content of greater than 50 ppm) and on low temperature duty cycles. Accordingly, there is a demand for further improvements in this area of technology.

SUMMARY

One embodiment is a unique strategy for raising exhaust temperatures which includes deactivating a first group of cylinders while maintaining a second group of cylinders in a combustion mode and injecting fuel into each one of the second group of cylinders not earlier than 2 degrees before top dead center (TDC). The strategy also includes passing fuel rich exhaust from the second group of cylinders into an exhaust pathway and oxidizing at least a portion of the fuel rich exhaust in the exhaust pathway. In one form, the oxidizing occurs independent of any catalytic influence. Other embodiments include unique methods, systems, and apparatus for raising exhaust temperatures and/or regenerating one or more components of an aftertreatment system. Further embodiments, forms, objects, features, advantages, aspects, and benefits shall become apparent from the following description and drawings.

DESCRIPTION OF THE ILLUSTRATIVE EMBODIMENTS

Figure 1:
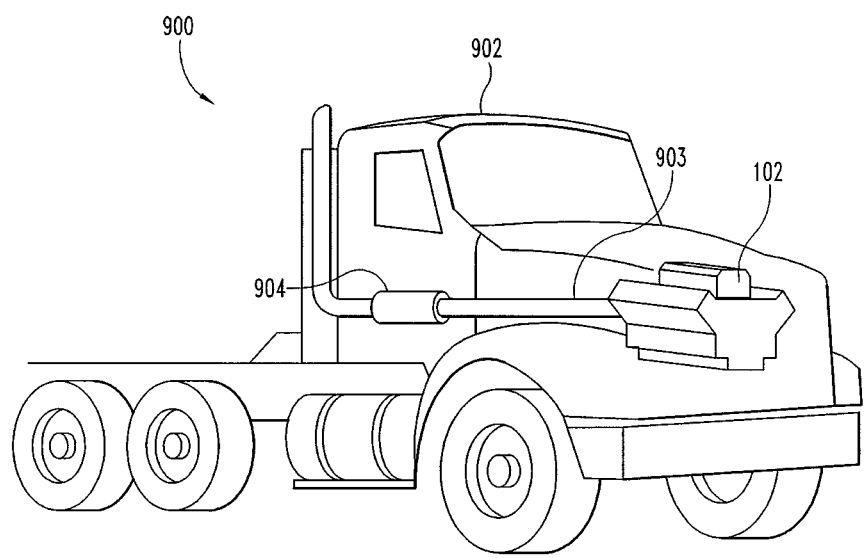
FIG. 1 is a schematic illustration of an application having an internal combustion engine and an aftertreatment system.

While the present invention can take many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications of the described embodiments, and any further applications of the principles of the invention as described herein are contemplated as would normally occur to one skilled in the art to which the invention relates.

FIG. 1 is a schematic illustration of an application 900 including a vehicle 902 that carries an internal combustion engine 102 from which an exhaust pathway 903 extends. The application 900 includes an aftertreatment system 904 in exhaust pathway 903 that reduces $NO_x$ emissions and requires periodic regeneration events. The engine 102 includes fuel injectors and a processing subsystem that controls the fuel injectors and other aspects of engine 102, further details of which will be provided below. The application 900 serves as an exemplary platform for the presently described systems, methods, techniques and apparatuses to generate temperature and other exhaust conditions to assist in regenerating one or more components of aftertreatment system 904.

Aftertreatment system 904 includes one or more aftertreatment components that benefit from certain adjustments to the exhaust environment, and/or that require periodic regeneration events to clear soot, renew catalytic activity, and/or remove sulfur deposits, just to provide a few non-limiting possibilities. Exemplary aftertreatment components include soot filters, catalyzed soot filters, $NO_x$ adsorbers, SCR catalyst components, and/or oxidation catalysts. Exemplary, non-limiting regeneration events include oxidizing soot from a soot filter, desorbing $NO_x$ from a $NO_x$ adsorber through rich and/or high temperature exhaust operation, clearing adsorbed $NH_3$ on an SCR catalyst, and/or desulfurizing a catalyst utilizing temperature.

Figure 2:
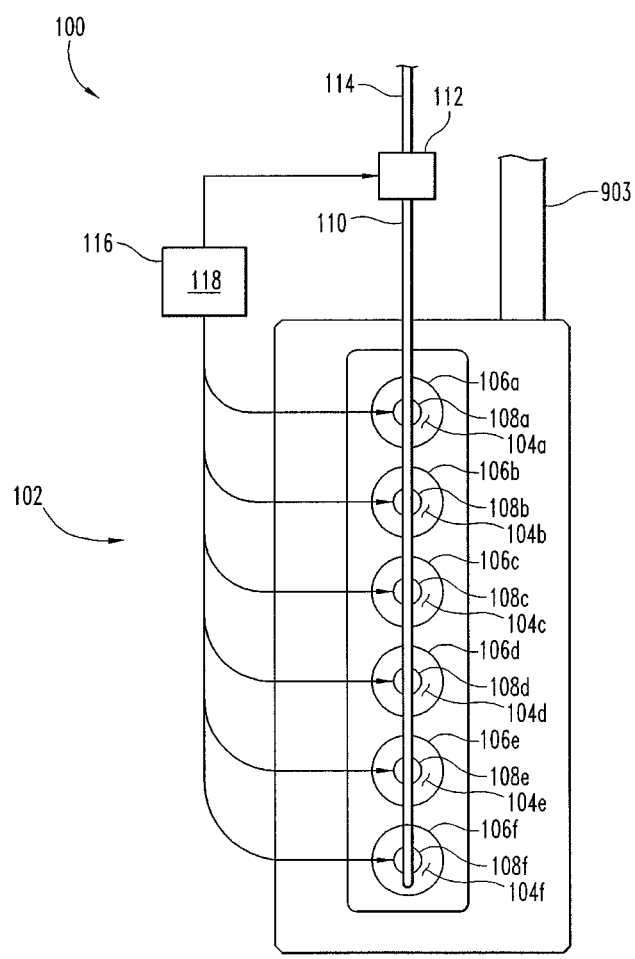
FIG. 2 is a schematic block diagram of a system for raising exhaust gas temperatures.

FIG. 2 is a schematic illustration of a system 100 for raising exhaust gas temperatures. System 100 includes engine 102 having a plurality of reciprocating pistons 104a-f positioned in respective ones of cylinders 106a-f. While engine 102 in the illustrated form includes six reciprocating pistons 104a-f and six corresponding cylinders 106a-f, it should be appreciated that forms in which engine 102 includes a different number of reciprocating pistons and corresponding cylinders are also possible, including those in which engine 102 only includes four reciprocating pistons and four corresponding cylinders. Engine 102 further includes a plurality of fuel injectors 108a-f capable of performing multiple fuel injection events with respect to one or more of cylinders 106a-f per one or two rotations of a crankshaft (not shown) of engine 102. In the illustrated form, fuel injectors 108a-f receive fuel from a pressurized common rail 110 which is coupled to a high pressure fuel pump 112. Fuel pump 112 is further coupled, directly or indirectly, to a fuel source by fuel line 114. While engine 102 illustrated in FIG. 2 includes a high pressure common rail fuel injection system, the present application contemplates any apparatus capable of delivering multiple fuel injection events with respect to one or more of cylinders 106a-f per rotation (or per two rotations) of the crankshaft of engine 102. In certain embodiments, system 100 includes an engine position sensor (not shown) that detects a current position of the crankshaft.

System 100 further includes a processing subsystem 116 including a controller 118. Processing subsystem 116 may be structured with controllers, modules, sensors, actuators, communication links, and other devices known in the art for performing the operations described herein. Controller 118 may be a single device or a distributed device, and the functions of controller 118 may be performed by hardware or software. All commands and information may be provided in alternate forms, some information may not be present in certain embodiments, and additional information may be present in certain embodiments. Information may be interpreted from sensor inputs, from datalink communications, from parameters on a storage medium readable by a computer, or through other information gathering devices understood in the art.

Figure 3:
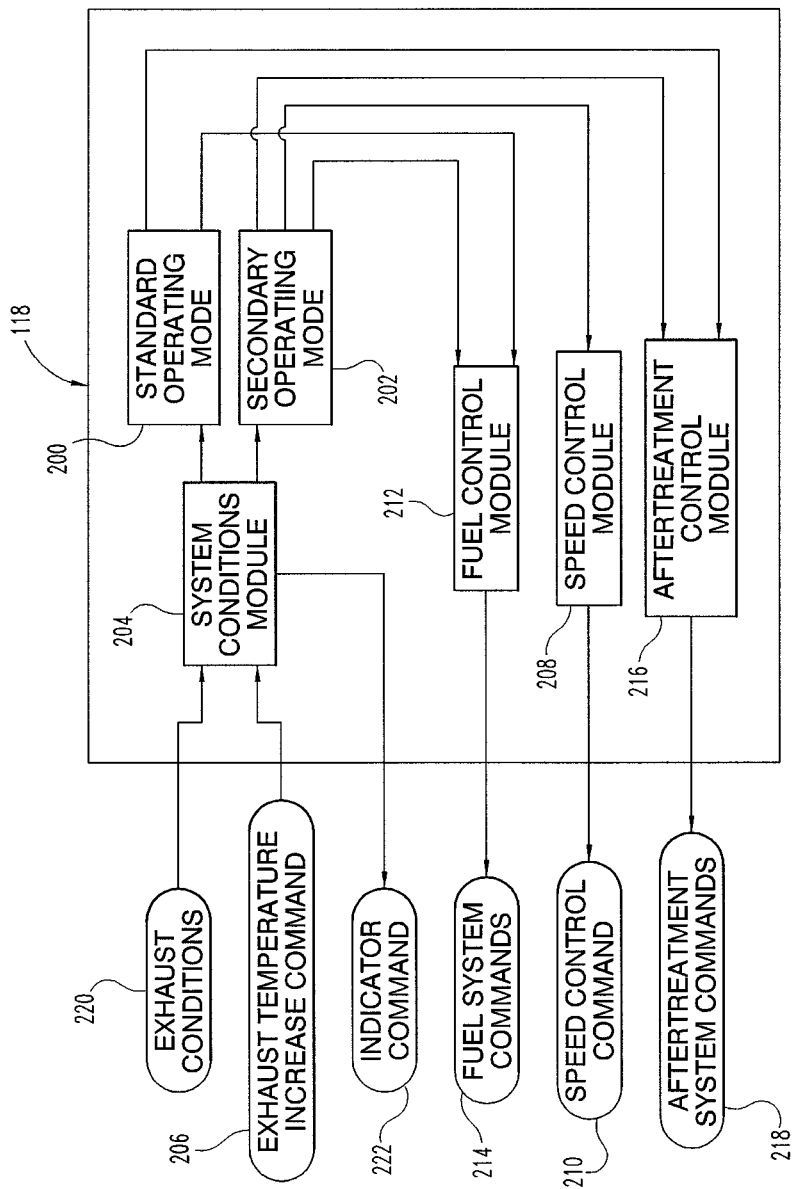
FIG. 3 is a schematic block diagram of a controller of the system illustrated in FIG. 2.

In certain embodiments, controller 118 includes one or more modules structured to functionally execute its operations. The description herein including modules emphasizes the structural independence of the aspects of controller 118, and illustrates one grouping of operations and responsibilities of controller 118. Other groupings that execute similar overall operations are understood within the scope of the present application. Modules may be implemented in hardware and/or software on computer readable medium, and modules may be distributed across various hardware or software components. More specific descriptions of certain embodiments of controller operations are provided below in connection with the schematic illustration of FIG. 3.

Controller 118 is generally structured to operate engine 102 in a standard operating mode 200 and a secondary mode 202 in which exhaust gas temperatures are raised relative to the standard operating mode 200. Engine 102 may be operated in secondary mode 202 for facilitating, amongst other possibilities, regeneration of one or more components of aftertreatment system 904, such as desulfurization of a catalyst. Further details regarding operation of engine 102 in secondary mode 202 will now be provided. More particularly, controller 118 includes a system conditions module 204 that interprets an exhaust temperature increase command 206 and determines to operate engine 102 in secondary mode 202 instead of standard mode 200. In one form, exhaust temperature increase command 206 is provided by a diagnostic or service tool in response to determining that regeneration of one or more components of aftertreatment system 904 is required. However, it is also contemplated that exhaust temperature increase command 206 may be generated by system conditions module 204 or some other module of controller 118 in response to interpreting one or more other commands or signals received by controller 118.

For operation in secondary mode 202, controller 118 is generally structured to control speed of engine 102 with a speed based approach rather than a fueling based approach. Similarly, after systems conditions module 204 of controller 118 determines engine 102 should be operated in secondary mode 202, speed control module 208 provides a speed control command 210. In general, speed control command 210 specifies that the speed of engine 102 during secondary mode 202 will be above the normal idle speed of engine 102 during its operation in standard operating mode 200. For example, in one form, speed control command 210 specifies that engine 102 is operated above 1000 rpm in secondary mode 202. In still another form, speed control command 210 specifies that engine 102 is operated in the range of 2000-2600 rpm in secondary mode 202. In yet another form, speed control command specifies that engine 102 is operated in the range of 2200-2500 rpm in secondary mode 202. In addition, while not previously discussed, it should be understood that engine 102 is operated in an unloaded condition in secondary mode 202. For example, in one non-limiting form, vehicle 902 may be removed from normal duty for servicing when engine 102 is operated in secondary mode 202.

Controller 118 also includes a fuel control module 212 which provides fuel system commands 214. When systems control module 204 determines that engine 102 should be operated in standard operating mode 200, fuel control module 212 provides unmodified fuel system commands 214 according to normal operations of system 100. However, for operation of engine 102 in secondary mode 202, fuel control module 212 of controller 118 is structured to provide a cylinder cutoff command as part of fuel system commands 214. A first number of injectors 108a-f is responsive to the cylinder cutoff command in order to cutoff fuel injection to a first number of corresponding cylinders 106a-f such that each one of the first number of cylinders 106a-f is deactivated and operated in a cutoff mode. With respect to the illustrated form, it is contemplated that the first number of cylinders operated in the cutoff mode can include as few as one of cylinders 106a-f and as many as four of cylinders 106a-f. In one particular form of the illustrated embodiment, the first number of cylinders operated in the cutoff mode includes three of cylinders 106a-f. Still, further variations are possible and contemplated. For example, in non-illustrated forms in which engine 102 includes only four cylinders, it is contemplated that as few as one or as many as two of the four cylinders may be operated in the cutoff mode.

Fuel control module 212 of controller 118 is further structured to provide a delayed fueling command as part of fuel system commands 214 when systems control module 204 determines that engine 102 should be operated in secondary operating mode 202. A second number of injectors 108a-f is responsive to the delayed fueling command in order to employ a delayed fuel injection scheme in connection with a second, remaining number of cylinders 106a-f which are operated in a combustion mode. More specifically, for the second number of cylinders 106a-f which are operated in the combustion mode, the second number of injectors 108a-f are responsive to the delayed fueling command to perform a main fuel injection event not earlier than 2 degrees before top dead center (TDC).

Figure 4:
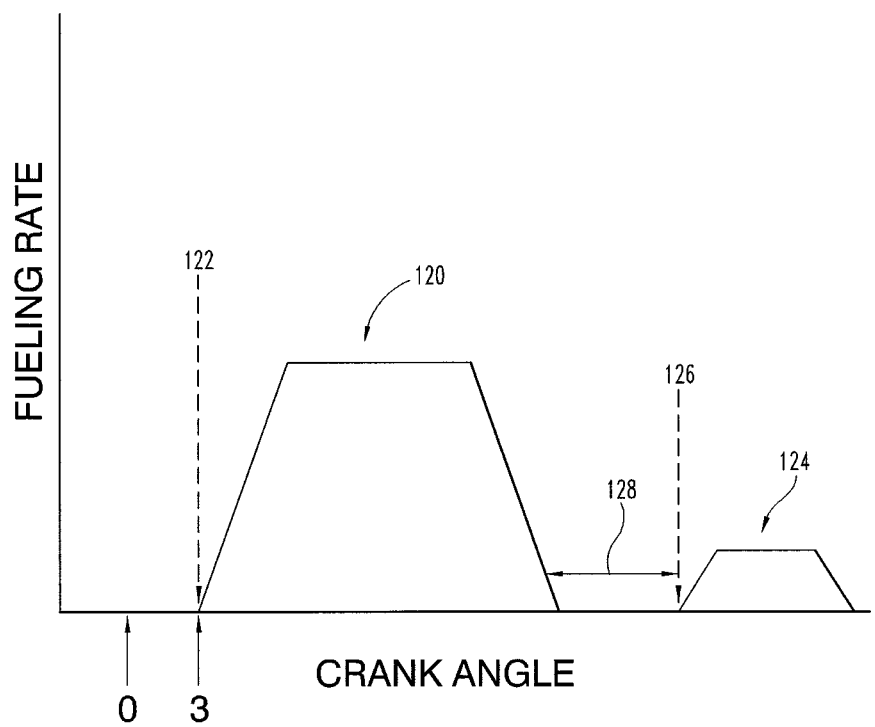
FIG. 4 is an illustration of a plurality of fuel injection events.

Depending upon the characteristics of the fuel system, the terms delivery of fuel, injection of fuel, and/or performing a fuel injection event at a specified crank angle degree indicate that the fueling event or start-of-injection (SOI) begins at the specified crank angle degree. For example, delivery after 3 degrees after TDC generally indicates a SOI after 3 degrees after TDC. Similarly, as illustrated in FIG. 4 for example, the SOI 122 of main fuel injection event 120 occurs at 3 degrees after TDC. It should be understood however that the illustration of FIG. 4 is non-limiting and that other timing for SOI 122 of main fuel injection event 120 is possible. For example, in one form, SOI 122 of main fuel injection event 120 is not earlier than 2 degrees before TDC. Still, in another form, SOI 122 of main fuel injection event 120 occurs at or after 2 degrees before TDC. In another form, the SOI 122 of main fuel injection event 120 is not earlier than TDC. In still another form, the SOI 122 of main fuel injection event 120 is not earlier than 3 degrees after TDC. In yet another form, the SOI 122 of main fuel injection event 120 is in the range of 2 degrees before TDC to 8 degrees after TDC. In another form, the SOI 122 of main fuel injection event 120 occurs between TDC and 8 degrees after TDC. In yet another form, the SOI 122 of main fuel injection event 120 is in the range of 3-8 degrees after TDC. In still another form, the SOI 122 of main fuel injection event 120 is in the range of 4-7 degrees after TDC. Still, other variations in the timing of main fuel injection event 120 are contemplated. In addition, it should be appreciated that main fuel injection event 120 may include one or more than one main injection combustion fuel amount.

The second number of injectors 108a-f is further responsive to the delayed fueling command to perform a post fuel injection event 124 following main fuel injection event 120. In the non-limiting form illustrated in FIG. 4, the SOI 126 of post fuel injection event 124 occurs at a delay 128 in the range of 14-16 degrees after end of injection (EOI) of main fuel injection event 120. In another form, the SOI 126 of post fuel injection event 124 is in the range of 13-17 degrees after EOI of main fuel injection event 120. In yet another form, the SOI 122 of post fuel injection event 124 is in the range of 13-18 degrees after EOI of main fuel injection event 120. Still, other variations in the timing of post fuel injection event 124 are contemplated. In addition, it should be appreciated that post fuel injection event 124 may include one or more than one post injection combustion fuel amount.

While not previously discussed, when operation of engine 102 in standard operating mode 200 involves a pilot fuel injection event, fuel control module 212 of controller 118 is further structured to provide a pilot fuel injection override command as part of fuel system commands 214 for operation of engine 102 in secondary operating mode 202. The second number of injectors 108a-f is responsive to the pilot fuel injection override command to deactivate the pilot fuel injection event. Moreover, it should be appreciated that the amounts of fuel injected during main fuel injection event 120 and post fuel injection event 124 account for a total amount of fuel injected during a respective combustion cycle. In one form in which cylinders 106a-f have a volume of 1.15 liters, the total amount of fuel injected per cylinder is in the range of 50-80 mg/stroke, 55-75 mg/stroke or 70-80 mg/stroke, just to provide a few non-limiting possibilities. It should be understood that the per cylinder total amount of fuel injected each stroke will commensurately change in forms in which cylinders 106a-f have a different volume. Further, in one form, the amount of fuel injected during main fuel injection event 120 is in the range of 70-90% of the total amount of fuel injected. In another form, the amount of fuel injected during main fuel injection event 120 is in the range of 75-85%, 70-80%, or 80-90% of the total amount of fuel injected, just to provide a few examples.

Fuel control module 212 of controller 118 is further structured to provide a reduced rail pressure command as part of fuel system commands 214 for operation of engine 102 in secondary mode 202. High pressure fuel pump 112 is responsive to the reduced rail pressure command to provide a rail pressure under 1000 bar. In a more particular form, the rail pressure is in the range of 300-700 bar. In still another form, the rail pressure is in the range of 350-600 bar. Alternative values for the rail pressure while engine 102 is operated in secondary mode 202 are also contemplated.

Figure 5:
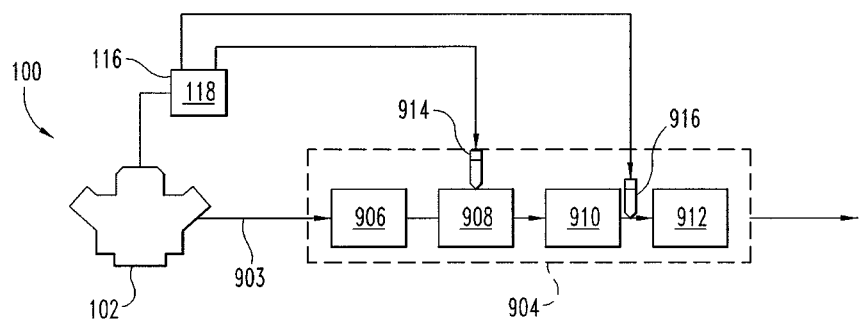
FIG. 5 is a schematic illustration of an exhaust aftertreatment system.

With more particular reference to FIG. 5, it should be appreciated that controller 118 may also be structured to communicate with one or more components of aftertreatment system 904. More particularly, in the schematic illustration of FIG. 5, aftertreatment system 904 includes a particulate filter 906, a decomposition pipe or tube 908, a $NO_x$ reduction catalyst 910 such as an SCR system, and an ammonia oxidation catalyst 912. Aftertreatment system 904 also includes a reductant injector or doser 914 that is coupled with decomposition pipe 908. It should be further appreciated that aftertreatment system 904 may include one or more components in addition to or in lieu of those illustrated, including by way of non-limiting example a diesel oxidation catalyst, and that the components could be provided in one or more arrangements other than that illustrated in FIG. 5.

Controller 118 also includes an aftertreatment control module 216 structured to provide one or more aftertreatment system commands 218. During operation of engine 102 in standard operating mode 200, aftertreatment control module 216 is structured to provide dosing commands at appropriate times to doser 914 as part of aftertreatment system commands 218. Doser 914 is responsive to the dosing commands to inject a reductant (e.g. urea, a hydrocarbon, and/or ammonia) into exhaust gas pathway 903 upstream of $NO_x$ reduction catalyst 910. However, in one form of operation of engine 102 in secondary mode 202, aftertreatment control module 216 of controller 118 is further structured to provide a doser override command as part of aftertreatment system commands 218. In this form, doser 914 is deactivated in response to the doser override command when engine 102 operates in secondary mode 202. However, it should be understood that forms in which doser 914 is not deactivated when engine 102 is operated in secondary mode 202 are also contemplated.

System 100 may also include a variety of sensors, including one or more temperature sensors which can be positioned upstream of aftertreatment system 904, between particulate filter 906 and $NO_x$ reduction catalyst 910, and/or downstream of aftertreatment system 904. In the illustrated form, system 100 includes a $NO_x$ sensor 916 that is positioned downstream of $NO_x$ reduction catalyst 910. Sensor 916 is generally structured to measure $NO_x$ levels in exhaust pathway 903 downstream of $NO_x$ reduction catalyst 910 and provide a corresponding signal to controller 118 as part of exhaust conditions 220. In one form, controller 118 is structured to determine if the signals received from sensor 916 are indicative of $NO_x$ levels that exceed a predetermined threshold and, if so, generate an indicator lamp command 222 for providing an indication to a user of engine 102 that current $NO_x$ levels are not acceptable. Controller 118 may also be structured to perform additional functions in response to receiving the signals from sensor 916. System 100 may also include one or more $NO_x$ sensors which can be positioned upstream of $NO_x$ reduction catalyst 910 and/or downstream of ammonia oxidation catalyst 912. The selection and location of sensors are not limiting, and a variety of sensor arrangements are contemplated. Still, system 100 may also include one or more of a turbocharger, an EGR system, or an injector upstream of particulate filter 906 that injects hydrocarbons to assist in regenerating particulate filter 906. In embodiments in which a hydrocarbon injector is positioned upstream of particulate filter 906, controller 118 may be further structured to provide a hydrocarbon injector override command such that the hydrocarbon injector is deactivated when engine 102 operates in secondary mode 202, although forms in which the hydrocarbon injector is not deactivated are also contemplated.

While not intending to be bound by any specific theory, it is believed that exhaust gas temperature increases provided by operating engine 102 in secondary mode 202 are created, in whole or in part, by facilitating oxidation of hot fuel rich exhaust gases downstream of engine 102. More particularly, operating engine 102 with the first number of cylinders 106a-f in cutoff mode generally creates higher operating temperatures which provides, amongst other things, air pumped through the first number of cylinders 106a-f with a higher temperature relative to the standard operating mode where each of cylinders 106a-f is operated in combustion mode. Similarly, the exhaust gases expelled from the second number of cylinders 106a-f operated in the combustion mode also generally have a higher temperature relative to the standard operating mode. In addition, it is believed that the delayed fueling scheme and reduced rail pressures discussed above result in excess unburnt hydrocarbons (UHC's) in the exhaust gas expelled from the second number of cylinders 106a-f. When the hot exhaust gas containing excess UHC's is combined with or meets the hot air pumped through the first number of cylinders 106a-f, it is believed that oxidation of at least a portion of the excess UHC's occurs to create additional heat in exhaust pathway 903 and raise the temperature of the exhaust gas.

While not previously discussed, it should be understood that the oxidation of at least a portion of the excess UHC's occurs independent of any catalytic influence. Stated alternatively, for embodiments such as the illustrated embodiment in which a diesel oxidation catalyst is not present, oxidation of the exhaust gases containing excess UHC's downstream of engine 102 still occurs. Moreover, for embodiments in which a diesel oxidation catalyst is present, it is contemplated that oxidation of exhaust gases containing excess UHC's will occur upstream of the diesel oxidation catalyst such that it does not promote or initiate the oxidation. Nonetheless, forms in which a diesel oxidation catalyst is present and promotes oxidation of the exhaust gases containing excess UHC's are also contemplated.

Figure 6:
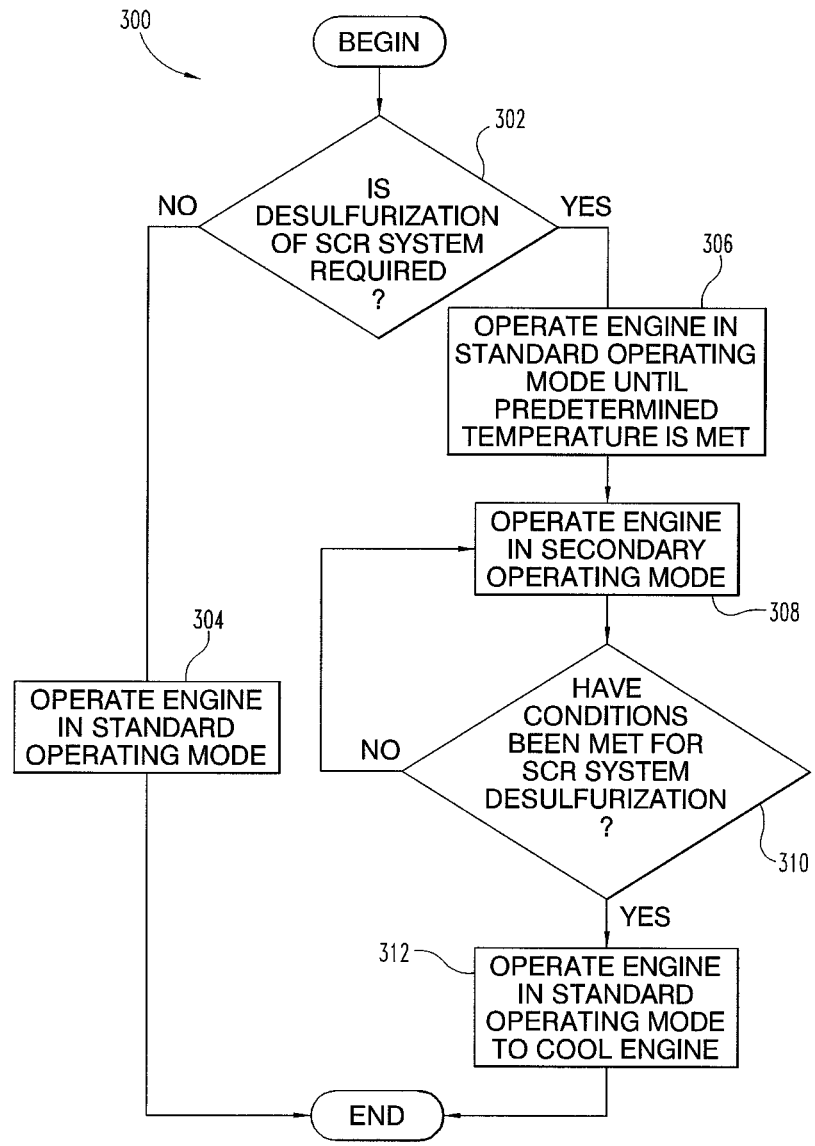
FIG. 6 is a schematic flow diagram illustrating a technique for raising exhaust gas temperatures.

As indicated above, in one form system 100 may used for raising exhaust gas to a temperature effective for regenerating one or more components of aftertreatment system 904. More particularly, in one non-limiting form, system 100 is used for desulfurization of NOx reduction catalyst 910 when it is in the form of an SCR system. Further details regarding one exemplary technique 300 for using system 100 in this manner will now be provided in connection with the schematic flow diagram illustrated in FIG. 6.

Technique 300 includes an operation 302 to determine if desulfurization of the SCR system is required. The determination that desulfurization of the SCR system is required may be based on events recorded and analyzed by controller 118, such as receiving various signals indicative of exhaust gas parameters from one or more downstream sensors, whether a predetermined period of time or usage of engine 102 has occurred, or by receiving a corresponding command from a diagnostic service tool. For example, in one form, the diagnostic service tool can be placed into communication with controller 118 by a service technician, and the service technician can provide an indication or command through the diagnostic service tool that desulfurization of the SCR system is necessary. In other forms, the diagnostic service tool may provide an indication or command to controller 118 that desulfurization of the SCR system is necessary with little or no input from the service technician. In response to determining that desulfurization of the SCR system is not required, the technique 300 includes an operation 304 to implement or maintain operation of engine 102 in standard operating mode 200.

However, in response to determining that desulfurization of the SCR system is required, such as by receiving a desulfurization command from the diagnostic service tool, technique 300 includes an operation 306 to implement operation of engine 102 in standard operating mode 200 until a predetermined temperature of engine coolant is met. In one non-limiting form, the predetermined temperature of engine coolant is 75° C., although it should be appreciated that other alternatives are also possible. Once the predetermined temperature of the engine coolant has been reached, technique 300 includes operation 308 to implement operation of engine 102 in secondary operating mode 202 as described above. In operation 308, the speed of engine 102 may be slowly increased until it reaches a desired operating speed such as those described above. Once the desired operating speed is reached, the remaining conditions of secondary operating mode 202 are performed in operation 308. Operation of engine 102 in secondary operating mode 202 may be continued until a desired temperature of the exhaust gas is reached for a period of time sufficient for desulfurization of the SCR system. In one form, the desired temperature is at least 300° C. In another form, the desired temperature is in the range of 300-550° C. Still, it should be appreciated that other values for the desired temperature are possible and contemplated. In addition, in one form, the period of time in which the exhaust gas has the desired temperature is at least 60 minutes. In another form, the period of time in which the exhaust gas has the desired temperature is in the range of 30-180 minutes. It should be understood however that other values for the desired time are possible and contemplated.

Technique 300 also includes operation 310 to determine if conditions have been met for desulfurization of the SCR system. For example, in one form, operation 310 might determine if the exhaust gas has had the desired temperature for a period of time sufficient for desulfurizing the SCR system. If it is determined in operation 310 that conditions for desulfurization of the SCR system have not been met, then technique 300 continues with operation 308 where operation of engine 102 in secondary mode 202 is performed. If it is determined in operation 310 that conditions for desulfurization of the SCR system have been met, then technique 300 continues with operation 312 in which engine 102 is operated in standard operating mode 200 for a period of time sufficient for engine 102 to properly cool before shut down.

EXAMPLES

The following examples are for illustration purposes and are not to be construed as limiting the invention disclosed in this document to only the embodiments disclosed in these examples.

The experimental data set forth in Table I below for Examples I-VI is related to testing performed in connection with engine operation for raising exhaust gas temperatures. In particular, the testing was related to raising exhaust gas temperatures from a six cylinder diesel engine to a level sufficient for facilitating desulfurization of a vanadium pentoxide catalyst of an SCR system. In general, desulfurization of the vanadium pentoxide catalyst can proceed with exhaust gas temperatures of at least 300° C. In addition, while not necessary, it is generally desired for UHC's in the exhaust gas entering the SCR to be less than 1000 ppm.

TABLE I

|  | Example No. | | | | | |
| --- | --- | --- | --- | --- | --- | --- |
|  | I | II | III | IV | V | VI |
| Engine Speed (rpm) | 2262 | 2262 | 2487 | 2487 | 2379 | 2379 |
| SOI Main Injection (Degrees After TDC) | 6.8 | 6.8 | 4.37 | 4.37 | 6.09 | 6.09 |
| Separation between EOI Main Injection and SOI Post Injection (Degrees) | 14.6 | 14.6 | 15.5 | 15.5 | 15.9 | 15.9 |
| Rail Pressure (bar) | 560 | 560 | 589 | 589 | 391 | 391 |
| Number of Cylinders in Combustion Mode | 3 | 3 | 3 | 3 | 3 | 3 |
| Total Fueling (mg/stroke) | 73 | 73 | 58 | 58 | 73 | 73 |
| Post Fueling (mg/stroke) | 10.7 | 10.7 | 14.3 | 14.3 | 11.2 | 11.2 |
| Catalyst Inlet Temperature (° C.) | 341 | 338 | 283 | 303 | 404 | 397 |
| Catalyst Inlet UHC's (ppm) | 551 | 581 | 524 | 260 | 249 | 121 |

The experimental data set forth in Table II below for Example VII is related to testing performed in connection with engine operation for raising exhaust gas temperatures. In particular, the testing was related to raising exhaust gas temperatures from a four cylinder diesel engine to a level sufficient for facilitating desulfurization of a vanadium pentoxide catalyst of an SCR system. In general, desulfurization of the vanadium pentoxide catalyst can proceed with exhaust gas temperatures of at least 300° C. In addition, while not necessary, it is generally desired for UHC's in the exhaust gas entering the SCR to be less than 1000 ppm.

TABLE II

| Example No. | VII |
| --- | --- |
| Engine Speed (rpm) | 2379 |
| SOI Main Injection (Degrees After TDC) | 6.09 |
| Separation between EOI Main Injection and SOI Post Injection (Degrees) | 15.9 |
| Rail Pressure (bar) | 391 |
| Number of Cylinders in Combustion Mode | 2 |
| Total Fueling (mg/stroke) | 73 |
| Post Fueling (mg/stroke) | 11.2 |
| Catalyst Inlet Temperature (° C.) | 283 |
| Catalyst Inlet UHC's (ppm) | 350 |

As is evident from the figures and text presented above, a variety of embodiments according to the present invention are contemplated.

One exemplary embodiment is a method that includes operating an internal combustion engine including a plurality of cylinders and an exhaust pathway above idle speed. The operating also includes deactivating a first group of the cylinders while maintaining a second group of cylinders in a combustion mode; injecting a first amount of fuel into each of the second group of cylinders not earlier than 2 degrees before top dead center (TDC); passing fuel rich exhaust from the second group of cylinders into the exhaust pathway; and oxidizing at least a portion of the fuel rich exhaust in the exhaust pathway independent of any catalytic influence.

In one form of this embodiment, the operating is performed with the internal combustion engine in an unloaded state. In another form of this embodiment, the engine further includes at least one aftertreatment component, and the oxidizing occurs upstream of the at least one aftertreatment component. In one aspect of this form, the at least one aftertreatment component is a selective catalytic reduction (SCR) system and the operating includes providing exhaust gas in the exhaust pathway with a temperature effective for facilitating desulfurization of the SCR system. In a further aspect, the temperature is in the range of 300-550° C.

In yet another form of this embodiment, the fuel is diesel. In still another form, the method further includes injecting a second amount of fuel into each one of the second group of cylinders after the first amount of fuel. In one aspect of this form, the first and second amounts of fuel define a total fuel injection amount, and the first amount of fuel is in the range of 70-90% of the total fuel injection amount. In a further aspect, the total fuel injection amount is in the range of 50-80 mg/stroke. In another form of this embodiment, injecting the first amount of fuel into each one of the second group of cylinders begins in the range of 2 degrees before TDC to 8 degrees after TDC. In one aspect of this form, the method further includes injecting a second amount of fuel into each one of the second group of cylinders, and injecting the second amount of fuel begins in the range of 13-17 degrees after end of injection of the first amount.

In another form of this embodiment, injecting the first amount of fuel into each one of the second group of cylinders is performed at a rail pressure under 1000 bar. In one particular aspect of this form, the rail pressure is in the range of 300-700 bar. In another aspect of this form, the rail pressure is in the range of 350-600 bar. In another form of this embodiment, the method further includes deactivating a doser positioned in the exhaust pathway. In still another form of this embodiment, the first group of cylinders includes at least two of the plurality of cylinders. In one aspect of this form, the engine includes six cylinders and the group of cylinders includes three of the six cylinders.

In still another form of this embodiment, operating the engine is performed at an engine speed in the range of 2100-2600 rpm. In yet another form of this embodiment, the method further includes accepting a regeneration command, and the operating is performed in response to accepting the regeneration command. In one aspect of this form, injecting the first amount of fuel into each one of the second group of cylinders is performed at a rail pressure under 1000 bar.

In another embodiment, a method includes determining a selective catalyst reduction (SCR) system requires desulfurization. In response to the determining, the method also includes operating a diesel engine coupled to the SCR system by an exhaust pathway and including a plurality of cylinders in a desulfurization mode which includes: running a first number of cylinders of the diesel engine in a combustion mode and a second number of cylinders of the diesel engine in a cut-off mode; injecting a main quantity of fuel into each one of the cylinders running in the combustion mode not earlier than 2 degrees before top dead center (TDC); and injecting a post quantity of fuel into each one of the cylinders running in the combustion mode following the main fuel injection.

In one form of this embodiment, operating the engine in the desulfurization mode is performed above idle speed and with the engine in an unloaded state. In another form, the method further includes, before operating the engine in the desulfurization mode, operating the engine in a standard operating mode until coolant temperatures exceed 75° C. In still another form, operating the engine in the desulfurization mode further includes overriding a pilot injection of fuel and deactivating a doser positioned in the exhaust pathway. In yet another form, the main and post quantities of fuel equal a total quantity of fuel injected during the combustion cycle, and the main quantity of fuel is in the range of 70-90% of the total quantity of fuel. In another form, injecting the main quantity of fuel into each one of the cylinders running in the combustion mode begins in the range of 2 degrees before TDC to 8 degrees after TDC and injecting the post quantity of fuel into each one of the cylinders running in the combustion mode begins in the range of 14-17 degrees after end of injection of the main quantity of fuel.

In still another form of this embodiment, the method further includes, before operating the engine in the desulfurization mode, operating the engine in a standard operating mode and reducing rail pressure when operating the engine in the desulfurization mode relative to the standard operating mode. In another form, injecting the main and post quantities of fuel into each one of the cylinders running in combustion mode is performed at a rail pressure in the range of 300-700 bar. In yet another form, the method further includes, in response to the determining, operating a service tool to instruct a control module of the diesel engine to transition from a standard operating mode to the desulfurization mode.

In still another embodiment, a system includes an internal combustion engine which includes a plurality of cylinders and is operable to produce an exhaust gas stream, and a selective catalyst reduction (SCR) system structured to treat the exhaust gas stream. The system also includes a controller structured to provide a cylinder cut-off command and a delayed fueling command with the engine operating above idle speed and in an unloaded state in response to determining that desulfurization of the SCR system is required.

In one form of this embodiment, the system further includes a fuel injection system responsive to the cylinder cut-off command to deactivate fuel injection to a first number of the plurality of cylinders and to the delayed fueling command to inject a main fuel injection into each one of a second number of the plurality of cylinders not earlier than 2 degrees before top dead center (TDC). In one aspect of this form, the fuel injection system is further responsive to the delayed fueling command to inject a post fuel injection into each one of the second number of cylinders. In a further aspect, the main fuel injection begins in the range of 2 degrees before TDC to 8 degrees after TDC and the post fuel injection begins in the range of 14-17 degrees after end of injection of the main fuel injection.

In another form of this embodiment, the controller is further structured to provide a pilot injection override command and a doser override command in response to determining that desulfurization of the SCR system is required. In still another form of this embodiment, the controller is further structured to provide a reduced rail pressure command in response to determining that desulfurization of the SCR system is required. In one aspect of this form, the system further includes a fuel injection system, and the fuel injection system is responsive to the reduced rail pressure command to reduce rail pressure to a value in the range of 300-700 bar.

In another embodiment, a system includes an internal combustion engine including a plurality of cylinders, and a controller structured to operate the engine in a standard operating mode and a regeneration mode where a first number of the cylinders is deactivated, a delayed fueling scheme is employed in connection with a second number of the cylinders, and oxidation of at least a portion of fuel rich exhaust gases occurs downstream of the engine and independent of any catalytic influence.

In one form of this embodiment, the system further includes a service tool operable to communicate with the controller and instruct the controller to operate in the regeneration mode in response to determining that desulfurization of a selective catalyst reduction (SCR) system is desired. In one aspect of this form, the delayed fueling scheme includes injection of a main fuel injection not earlier than 2 degrees before top dead center (TDC) and a post fuel injection following the main fuel injection. In another form, the engine runs above idle and in an unloaded condition during the regeneration mode. In still another form, the oxidation provides an exhaust gas stream with a temperature in the range of 300-550° C. In yet another form, the delayed fueling scheme includes a rail pressure in the range of 300-700 bar.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred, more preferred or exemplary utilized in the description above indicate that the feature so described may be more desirable or characteristic, nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
   operating an internal combustion engine above idle speed, said engine including a plurality of cylinders and an exhaust pathway, and said operating including:
   deactivating a first group of said cylinders while maintaining a second group of cylinders in a combustion mode;
   injecting a first amount of diesel fuel into each of said second group of cylinders not earlier than 2 degrees before top dead center (TDC);
   passing fuel rich exhaust from said second group of cylinders into said exhaust pathway; and
   oxidizing at least a portion of said fuel rich exhaust in said exhaust pathway independent of any catalytic influence.

2. The method of claim 1, wherein said operating is performed with said internal combustion engine in an unloaded state.

3. The method of claim 1, which further includes deactivating a doser positioned in said exhaust pathway.

4. The method of claim 1, wherein operating said engine is performed at an engine speed in the range of 2100-2600 rpm.

5. The method of claim 1, wherein oxidizing at least the portion of said fuel rich exhaust in said exhaust pathway independent of any catalytic influence includes combining said fuel rich exhaust with air pumped through the first group of said cylinders into the exhaust pathway.

6. The method of claim 1, wherein injecting said first amount of fuel into each one of said second group of cylinders begins in the range of 2 degrees before TDC and 8 degrees after TDC.

7. The method of claim 6, which further includes injecting a second amount of fuel into each one of said second group of cylinders, said injecting of said second amount of fuel beginning in the range of 13-17 degrees after end of injection of said first amount.

8. The method of claim 1, wherein said first group of cylinders includes at least two of said plurality of cylinders.

9. The method of claim 8, wherein said engine includes six cylinders and said first group of cylinders includes three of said six cylinders.

10. The method of claim 1, which further includes accepting a regeneration command, and wherein said operating is performed in response to accepting said regeneration command.

11. The method of claim 10, wherein injecting said first amount of fuel into each one of said second group of cylinders is performed at a rail pressure under 1000 bar.

12. The method of claim 1, wherein injecting said first amount of fuel into each one of said second group of cylinders is performed at a rail pressure under 1000 bar.

13. The method of claim 12, wherein said rail pressure is in the range of 300-700 bar.

14. The method of claim 12, wherein said rail pressure is in the range of 350-600 bar.

15. The method of claim 1, wherein said engine further includes at least one aftertreatment component, and said oxidizing occurs upstream of said at least one aftertreatment component.

16. The method of claim 15, wherein said at least one aftertreatment component is a selective catalytic reduction (SCR) system and said operating includes providing exhaust gas in said exhaust pathway with a temperature effective for facilitating desulfurization of said SCR system.

17. The method of claim 16, wherein said temperature is in the range of 300-550° C.

18. The method of claim 1, which further includes injecting a second amount of fuel into each one of said second group of cylinders after said first amount of fuel.

19. The method of claim 18, wherein said first and second amounts of fuel define a total fuel injection amount, said first amount of fuel being in the range of 70-90% of said total fuel injection amount.

20. The method of claim 19, wherein said total fuel injection amount is in the range of 50-80 mg/stroke.

\* \* \* \* \*